(12) United States Patent
Brooks et al.

(10) Patent No.: US 11,094,022 B2
(45) Date of Patent: Aug. 17, 2021

(54) CALCULATING LISTS OF EVENTS IN ACTIVITY STREAMS

(71) Applicant: International Business Machines Corporation, Armonk, NY (US)

(72) Inventors: David A. Brooks, Providence, MA (US); Miguel A. Estrada, Hollis, NH (US); Ethan L. Perry, Lexington, MA (US); Thomas Schaeck, Achern (DE); Michael C. Wanderski, Chapel Hill, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 435 days.

(21) Appl. No.: 16/117,551

(22) Filed: Aug. 30, 2018

(65) Prior Publication Data

US 2018/0374163 A1 Dec. 27, 2018

Related U.S. Application Data

(60) Division of application No. 14/077,052, filed on Nov. 11, 2013, now Pat. No. 10,163,172, which is a continuation of application No. 13/855,572, filed on Apr. 2, 2013, now Pat. No. 10,109,021.

(51) Int. Cl.
*G06F 16/00* (2019.01)
*G06Q 50/00* (2012.01)
*G06F 16/2457* (2019.01)
*G06Q 10/10* (2012.01)

(52) U.S. Cl.
CPC ....... *G06Q 50/01* (2013.01); *G06F 16/24578* (2019.01); *G06Q 10/10* (2013.01)

(58) Field of Classification Search
CPC .................................................. G06F 16/24578
USPC ........................................ 707/733, 734, 748
See application file for complete search history.

(56) References Cited

U.S. PATENT DOCUMENTS

| | | | |
|---|---|---|---|
| 6,438,579 B1 * | 8/2002 | Hosken | G06Q 30/02 709/203 |
| 8,176,046 B2 | 5/2012 | Druzgalski et al. | |
| 8,306,922 B1 | 11/2012 | Kunal | |
| 2009/0106307 A1 | 4/2009 | Spivack | |
| 2010/0268830 A1 * | 10/2010 | McKee | G06Q 10/10 709/228 |
| 2011/0004692 A1 * | 1/2011 | Occhino | H04L 67/16 709/228 |
| 2011/0225197 A1 | 9/2011 | Howes et al. | |
| 2012/0110080 A1 * | 5/2012 | Panyam | G06Q 50/01 709/204 |
| 2012/0191776 A1 | 7/2012 | Ruffner et al. | |
| 2012/0253918 A1 | 10/2012 | Marois et al. | |
| 2013/0031489 A1 * | 1/2013 | Gubin | G06Q 50/01 715/753 |
| 2013/0159110 A1 | 6/2013 | Rajaram et al. | |
| 2013/0174275 A1 | 7/2013 | Micucci et al. | |
| 2014/0019457 A1 | 1/2014 | Xie | |

(Continued)

*Primary Examiner* — Chelcie L Daye
(74) *Attorney, Agent, or Firm* — Fabian VanCott; Steven L. Nichols

(57) ABSTRACT

A method for calculating lists of events in activity streams includes calculating a list of activity events for a user's activity stream based on weights assigned to implicit actions and explicit actions and prioritizing the list of the activity events in the user's activity stream based on the weights.

20 Claims, 5 Drawing Sheets

(56) References Cited

U.S. PATENT DOCUMENTS

2014/0025734 A1   1/2014  Griffin
2014/0172876 A1*  6/2014  Rubinstein .......... G06F 16/9535
                                                           707/748

* cited by examiner

CALCULATING LISTS OF EVENTS IN ACTIVITY STREAMS

BACKGROUND

The present invention relates to calculating lists of events in activity streams, and more specifically, to calculating list of events in activity streams in social network services.

A social network service is a web based application to enable a user to establish connections with other users such as friends, family, and colleagues in an online environment. Once a user is connected to other users, the users may share information with each other on the social network service by uploading pictures, updating personal information, commenting on other user's information, among other activities. A social network service uses an activity stream to display this information shared between the users. An activity stream allows a user to be aware of collaborative actions taken by other users. In addition to establishing connections with other users, a user may follow a resource such as an item or topic of interest. By following a resource, the resource is displayed in a user's activity stream. Thus, a user's activity stream displays shared information from other users, as well as resources.

BRIEF SUMMARY

A method for calculating lists of events in activity streams includes calculating a list of activity events for a user's activity stream based on weights assigned to implicit actions and explicit actions and prioritizing the list of activity events in the user's activity stream based on the weights.

A system for calculating lists of events in activity streams includes a user device including a user interface allowing a user to access multiple social network services and multiple product websites and a social network server in communication with the user device to capture a user's interactions of multiple resources from the multiple social network services and the multiple product websites.

A computer program product includes a computer readable storage medium, the computer readable storage medium having computer readable program code embodied therewith. The computer readable program code having computer readable program code to calculate a list of activity events for a user's activity stream based on weights assigned to implicit actions and explicit actions and prioritize the list of activity events in the user's activity stream based on the weights.

A system for calculating lists of events in activity streams includes a calculation engine to calculate a list of activity events for a user's activity stream based on weights assigned to implicit actions and explicit actions and a priority engine to prioritize the list of activity events in the user's activity stream based on the weights.

A method for calculating lists of events in activity streams includes capturing a user's interactions of multiple resources from multiple websites to determine implicit actions and explicit actions, weighing the multiple implicit actions and explicit actions, calculating a list of activity events for a user's activity stream based on weights assigned to implicit actions and explicit actions, prioritizing the list of activity events in the user's activity stream based on the weights, and displaying the list of the prioritized activity events in the user's activity stream.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
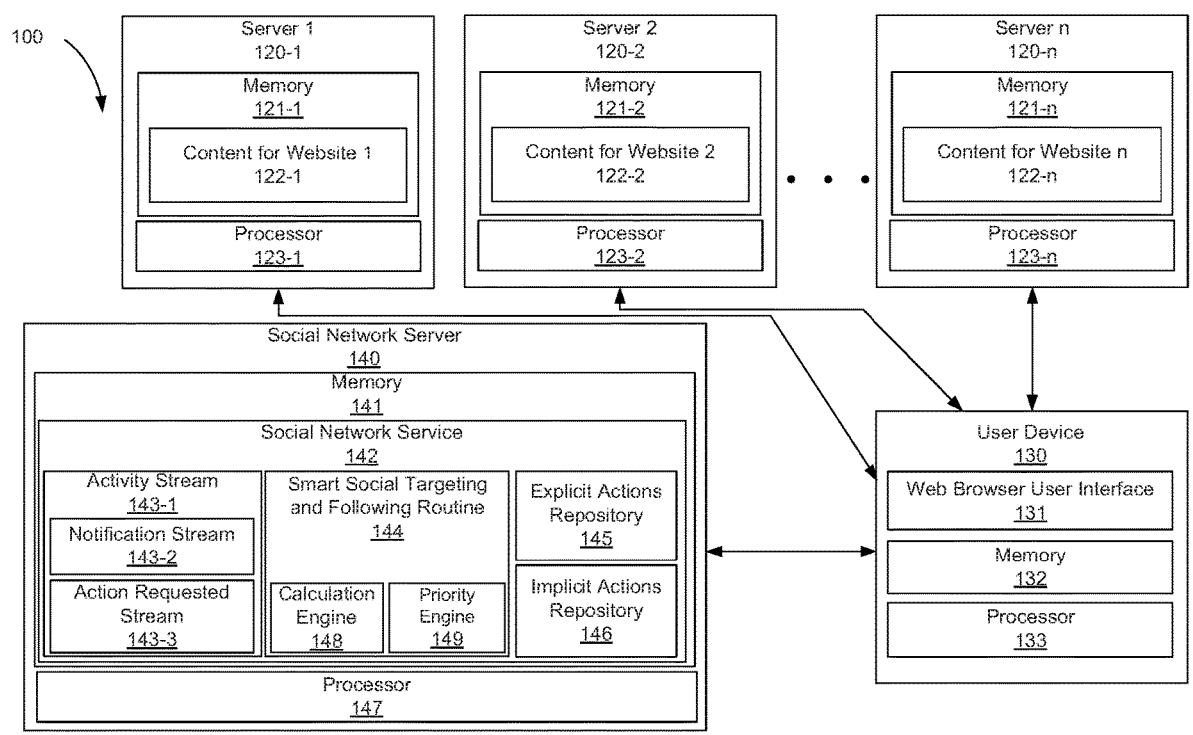
FIG. 1 is a diagram of an example of a system for calculating lists of events in activity streams, according to one example of principles described herein.

The present specification describes a method and system for calculating lists of events in activity streams in social network services such that the list of events in the activity stream is of interest to a user of a social network service.

As will be appreciated by one skilled in the art, aspects of the present specification may be embodied as a system, method, or computer program product. Accordingly, aspects of the present specification may take the form of hardware or a combination of hardware and software. Furthermore, aspects of the present specification my take the form of a computer program product embodied in a number of computer readable mediums having computer readable program code embodied thereon.

Any combination of computer readable medium(s) may be utilized. The computer readable medium may be a computer readable signal medium or a computer readable storage medium. A computer readable storage medium may be, for example, but not limited to, an electronic, magnetic, optical electromagnetic, infrared, or semiconductor system, apparatus, or device or any suitable combination of the foregoing. More specific examples (a non-exhaustive list) of the computer readable mediums would include the following: an electrical connection having a number of wires, a portable computer diskette, a hard disk, a random access memory (RAM), a read-only memory (ROM), an erasable programmable read-only memory (EPROP or Flash memory), an optical fiber, a portable compact disk read-only memory (CD-ROM), an optical storage device, a magnetic storage device, or any suitable combination of the foregoing. In the context of this document, a computer readable storage medium may be any tangible medium that can contain, or store a program for use by or in connection with any instruction execution system, apparatus, or device such as, for example, a processor.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations of the present specification may be written in an object oriented programming language such as Java, Smalltalk, or C++, among others. However, the computer program code for carrying out operations of the present systems and methods may also be written in procedural programming languages, such as, for example, the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, thought the internet using an internet service provider).

Flowchart illustrations and/or block diagrams of methods, apparatus, and computer program products are disclosed. Each block of the flowchart illustrations and/or block diagrams, and combinations of blocks in the flowchart illustrations and/or block diagrams, can be implemented by computer program instructions. These computer program instructions may be provided to a processor or other programmable data processing apparatus to produce a machine, such that the instructions, which execute via a processor of the computer or other programmable data processing apparatus, implement the functions/acts specified in the flowchart and/or block diagram block or blocks.

In one example, these computer program instructions may be stored in a computer-readable memory that can direct a computer or other programmable data processing apparatus to function in a particular manner, such that the instructions stored in the computer-readable memory produce an article of manufacture including instructions which implement the functions/act specified in the flowchart and/or block diagram blocks or blocks.

The computer program instructions may also be loaded onto a computer or other programmable data processing apparatus to cause a series of operations to be performed on the computer or other programmable apparatus to produce a computer implement process such that the instructions which execute on the computer or other programmable apparatus implement the functions/acts specified in the flowchart and/or block diagram blocks or blocks.

As noted above, an activity stream allows a user to be aware of collaborative actions of other users as well as information about resources. Although establishing a connection to another user or resource allows information to be displayed in a user's activity stream, if a user establishes a connection to hundreds of users or resources, a user's activity stream is overburdened with information to display. Further, depending on each user's likes and interests, a user's activity stream is prioritized to display relevant information first.

To prioritize relevant information to be displayed in a user's activity stream, a social network service can use an edgerank function. The edgerank function is used to prioritize relevant information such as top news and most recent news in a user's activity stream. In one example, the top news and the most recent news are displayed first in a user's activity stream. After the top news and the most recent news are displayed, less relevant information from other users or resources are displayed. Further, the edgerank function uses many explicit events to prioritize the top news and the most recent news in a user's activity stream. For example, explicit events may include the number of friends commenting on a post, who posted the content, and the type of content such as photographs, videos, status updates, the number of likes, how many users clicked on a photograph, among others. Although the edgerank function takes into account a user's social network and explicit events, the edgerank function is merely prioritizing a user's existing activity stream.

Further, the edgerank function does not account for when a user connects with a broader social network services, such as blogs, communities, forums, profiles, or even product websites. By connecting with a broader social network service or product websites, a user may implicitly express interest in users or resources from these services and websites. Further a user may express an explicit interest in an item or topic from a broader social network service or product website. These implicit and explicit interests are not displayed in a user's activity stream on a social network service. For example, assume a user expresses implicitly and/or explicitly interest in a blogging website. The blog posts from this blogging website won't be displayed in a user's activity stream unless the user finds a subscribe link for the blogging website and subscribes to the link. Further, subscribing to the link would be a bookmark and the continued blog posts and activity is excluded all together on the user's activity stream.

The principles described herein include a system and a method to prioritize a list of activity events in a user's activity stream. Thus, the prioritized list of activity events in a user's activity stream is determined by weighed implicit actions and explicit actions. This will make a user aware of updates, comments, likes and other events from users and resources. The activity events may be implicit actions, explicit actions, other actions, or combinations thereof. An action may include actions taken by a user on the user's client device. More detail about actions will be described below.

In one example, a method for prioritizing a list of activity events in a user's activity stream includes calculating a list of activity events for a user's activity stream based on weighted implicit actions and explicit actions and prioritizing the list of activity events in a user's activity stream based on the weighted implicit actions and explicit actions of the list of activity events.

This method may also include capturing implicit actions and explicit actions, when a user interacts with a broader social network or product websites, to leverage trending topics and semantics on phrases to extract meaningful topics. In such an example, a user uses a web browser user interface on a user device to access broader social network services, such as blogs, communities, forums, profiles, or even product websites. As the user interacts with resources from these broader social network services or product websites, implicit actions and explicit actions are captured. For example, when a user accesses a product website, a user will encounter resources. In one example these resources can be people, products, content, tags, and topics, among others. As a user views these resources, the user is expressing an interest in these resources. For example, as a user types a topic in a search engine, the user is implicitly expressing an interest in such topics. Further, a user can want a resource such as an item or add the item to a wish list. As will be described below, a social targeting and following routine captures a user's implicit actions and explicit actions to leverage trending topics and semantics on phrases to extract meaningful topics. These implicit actions and explicit actions are captured by a system to influence activity events to be used when rendering the user's activity stream.

The captured implicit actions and explicit actions are weighed. In one example, weighing multiple implicit actions is determined in part by a relationship of a user to a resource, time spent viewing a resource, age of last view of a resource, frequency of views of a resource, use of trending terms, and a collective graph from a user's social graph. Further, implicit actions with a higher weight signify the implicit actions are more relevant to the user. Alternatively, implicit actions with a lower weight signify the implicit actions are less relevant to a user.

Additionally, weighing multiple explicit actions is determined by a user indicating interest in a resource such as reading a profile, visiting a community, replying to a topic, tagging a bookmark, repeating a view, marking a favorite, prioritizing a favorite, deprioritizing a favorite, sharing the resource, sharing the resource with an importance flag, using an action requested event, or other indicators of higher than average importance. Further, explicit actions with a higher weight signify the explicit actions are more relevant to the user. Alternatively, explicit actions with a lower weight signify the explicit actions are less relevant to a user.

Based on the weighed implicit actions and explicit actions, a list of activity events for a user's activity stream is calculated. The list of activity events is determined by weight of implicit actions and explicit actions captured by the system from the broader social network services, such as blogs, communities, forums, profiles, or even product websites.

Also, the list of activity events in a user's activity stream is prioritized. Prioritizing the list of activity events in a user's activity stream is based on the weighted implicit actions and explicit actions of the list of activity events. For example, implicit actions and explicit actions with a higher weight are prioritized before implicit actions and explicit actions with a lower weight.

The prioritized list of activity events may be displayed in the user's activity stream. Displaying the prioritized list of activity events includes displaying first the activity events in the activity stream where implicit actions and explicit actions that were indicated to be highest priority. The implicit actions and explicit actions influence which activity events are displayed in a user's activity stream and in what order the activity events are to be displayed. For example, implicit actions and explicit actions having a higher priority are used to display activity events in the user's activity stream corresponding to these high priority implicit actions and explicit actions before activity events corresponding to implicit actions and explicit actions having a lower priority. In one example, each implicit action or explicit action corresponds to an activity event. In another example, a set of implicit actions or a set of explicit actions corresponds to a single activity event. Thus, based on a user's interaction with resources, implicit actions and explicit actions are captured and are later re-used to influence which activity events are displayed in a user's activity stream and in what order the activity events are to be displayed when rendering a user's activity stream.

The present specification also describes a system for capturing implicit actions and explicit actions by using user device with a user interface to allow a user to access a broader social network services, such as blogs, communities, forums, profiles, or even product websites; and a social network server in communication with the user device to capture a user's interactions of multiple resources from multiple websites to serve as implicit actions and explicit actions.

A broader social network services may be a blog, a forum, a thread, a profile, or any appropriate combination thereof. A resource may be an object or content that a user can interact with on a broader social network service or even product websites. For example, a resource can be people, products, content, tags, and topics.

An explicit action is a user's expressed interest in a resource. For example, an explicit action may be determined when a user reads a profile, visits a community, replies to a topic, tags a bookmark, repeats a view, marks a favorite, prioritizes a favorite, deprioritizes a favorite, connects to another user, likes a resource, shares a resource with an importance flag, using an action requested event, other indicators of higher than average relevance, or combinations thereof. It should be noted that not all explicit actions are used as activity event in a user's activity stream. For example, an explicit action that is not used as activity event in a user's activity stream is repeat view. However, an explicit action used as activity event that is in a user's activity stream is reply to a topic. Additionally, explicit actions are used to influence which activity events are displayed in a user's activity stream and in what order the activity events are to be displayed.

An implicit action is a user's implied interest in a resource. For example, an implicit action may be determined by a relationship of a user to a resource, viewing a resource, use of trending terms, a collective graph from a user's social graph, or conditions, or combinations thereof. Additionally, implicit actions are used to influence which activity events are displayed in a user's activity stream and in what order the activity events are to be displayed.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

As will be described in detail below, a method for calculating lists of events in activity streams includes calculating a list of activity events for a user's activity stream based on weighted implicit actions and explicit actions. The method then includes prioritizing the list of activity events in a user's activity stream based on the weighted implicit actions and explicit actions of the list of activity events.

Referring now to the figures, FIG. 1 is a diagram of an example of a system for calculating lists of events in activity streams, according to one example of principles described herein. As mentioned above, a social network service may capture resources of interest, such as objects or content, to a user based on implicit actions and explicit actions. For example, when a user accesses a website, a user will encounter resources. In one example these resources can be people, products, content, and tags among others. As a user views these resources, the user is expressing an interest in these resources. For example, as a user types a topic in a search engine, the user is expressing an interest in such topics. In another example, a user can follow resources such as an object or a person. As will be described below, a social targeting and following routine captures implicit actions and explicit actions to leverage trending topics and semantics on phrases to extract meaningful topics. These explicit actions and implicit actions are captured by a system and later re-used to influence activity events when rendering events in the user's activity stream. Additionally, a collective viewing pattern of a user's social graph acts as a filter on a user's activity to further refine a function driving what activity events are displayed on a user's activity stream, each with a weighted impact based on a degree of relationship. This influence is both for inclusion and prioritization of events displayed in a user's activity stream.

The system (100) includes a user device (130) using a web browser interface (131) to connect to a number of servers (120). Using the web browser interface (131), a user may interact with content, such as websites, stored on a number of servers (120). For example, a user may access server 1 (120-1). In this example, server 1 (120-1) stores, in memory (121-1), contents for website 1 (122-1). Assume the contents for website 1 (122-1) includes topics and merchandise for laptops, tablets, and desktop computers. Thus, using the web browser user interface (131) a user, using a user device (130), interacts with the content for website 1 (122-1).

Further, assume server 2 (120-2) stores, in memory (121-2), contents for website 2 (122-2). Assume the contents for website 2 (122-2) includes topics and merchandise for guitars. Thus, using the web browser user interface (131) a user, using a user device (130), interacts with the content for website 2 (122-2).

Further, assume server n (**120-*n*) stores, in memory (121-*n*), contents for website n (122-*n*). Assume the contents for website n (122-*n*) includes topics and merchandise for music. Thus, using the web browser user interface (131) a user, using a user device (130), interacts with the content for website n (122-*n***).

The system (100) further includes a social network server (140). The social network server (140) stores, in memory (141) a social network service (142). In one example, the social network service (142) includes an activity stream (143-1) to display information shared by other users. As noted above, the activity stream allows a user to be aware of collaborative actions by other users. In keeping with the given example, the activity stream (143-1) includes a sub-activity stream such as a notification stream (143-2) and action requested stream (143-3). The notification stream (143-2) displays activity events indicated by mentioning a user in a status update, in a comment, on a resource, or any appropriate combination thereof. As will be described below, mentioning a user in a status update, in a comment, on a resource, or any appropriate combination thereof enables the user to be notified of such an event. The action requested stream (143-3) displays activity events indicated by an action requested event. As will be described below, an action requested event allows a user to take an action such as access a file. Thus, using the web browser user interface (131) a user, using a user device (130), interacts with the activity stream (143-1-1). In one example, the activity stream (143-1) displays photographs that other users have posted, comments from other users, among other things.

In one example, a smart social targeting and following routine (144) is stored in memory (141) on a social network server (140). The smart social targeting and following routine (144) is used to capture a user's implicit actions and explicit actions, prioritizes activity events influenced by the implicit actions and explicit actions as a list of activity events, and display the activity events on a user's activity stream (143-1). Further, activity events are based on resources, such as content and users, which a user is currently following. Resources such as content and users that a user is currently following are reprioritized or are given a higher weight by a user's implicit actions and explicit actions indicate an expressed interest in the resource. Additionally, resources such as content and users that a user is not currently following can be displayed in a user's activity stream (FIG. 1, 143-1) if a user's implicit actions and explicit actions indicate an expressed interest in the resource. The smart social targeting and following routine (144) and method is described in connection with FIG. 2 and FIG. 3 and in later sections of this specification.

Further, the smart social targeting and following routine (144) has a calculation engine (148) and a priority engine (149). The engines represent the program instructions to carry out their indicated functions. The calculation engine (149) calculates a list of activity events based on weighed implicit actions and explicit actions. The priority engine (149) prioritizes a list of activity events.

In keeping with the given example, the smart social targeting and following routine (144) captures a user's implicit actions while accessing other social network services and websites. The captured implicit actions are stored in an implicit actions repository (146). For example, assume a user accesses server 2 (120-2). Using the web browser user interface (131), the user interacts with content for website 2 (122-2). As mentioned above, the content for website 2 (122-2) includes topics and merchandise for guitars. Assume the user views a guitar manufactured by manufacturer X frequently. Consequently, the user implicitly expresses interest in the guitar manufactured by manufacturer X. Thus, the smart social targeting and following routine (144) captures the implicit actions and stores the implicit event's details in the implicit actions repository (146).

In another example, assume a user accesses server n (**120-*n*). Using the web browser user interface (131), the user interacts with content for website n (122-*n*). As mention above, the content for website n (122-*n*) includes topics and merchandise for music. Assume the user spends most of their time viewing music by artist Z. Further, assume the user also views music by artist Y. However, less time is spent by the user viewing music by artist Y. Consequently, the user implicitly expresses interest in music by artist Z and artist Y. Thus, the smart social targeting and following routine (144) captures the implicit actions and stores the implicit action's details in the implicit actions repository (146**).

In yet another example, assume a user accesses server 1 (120-1). Using the web browser user interface (131), the user interacts with content for website 1 (122-1). As mention above, the content for website 1 (122-1) includes topics and merchandise for computers. Assume the user spends most of their time viewing laptops manufactured by manufacturer Z. In one example, assume the user clicks a want button next to a laptop manufactured by manufacturer Z. Consequently, the user explicitly expresses interest in the laptop manufactured by manufacturer Z. Thus, the smart social targeting and following routine (144) captures the explicit action and stores the explicit action's details in the explicit events repository (145).

Thus, a social network service has captured multiple resources of interest to a user based on the user's implicit actions and explicit actions. As will be described below, the smart social targeting and following routine (144) prioritizes and displays the objects or content as activity events on a user's activity stream (143-1).

In keeping with the examples given above, assume the smart social targeting and following routine (144) prioritizes activity events influenced by explicit actions before activity events influenced by implicit actions in a user's activity stream (143-1). Thus, when rendering activity events in a user's activity stream (143-1), the laptop manufactured by manufacturer Z is displayed first in a user's activity stream (143-1). Next, assume the smart social targeting and following routine (144) prioritizes implicit actions by the frequency of viewing an object or content. Thus, when rendering activity events in a user's activity stream (143-1), the guitar manufactured by manufacturer X is displayed after the laptop manufactured by manufacturer Z in a user's activity stream (143-1). Next, assume the smart social targeting and following routine (144) prioritizes activity events influenced by implicit actions such as time spend view a resource. Thus, when rendering activity events in a user's activity stream (143-1), music by artist Z is displayed after the guitar manufactured by manufacturer X and before music by artist Y in a user's activity stream (143-1).

Figure 2:
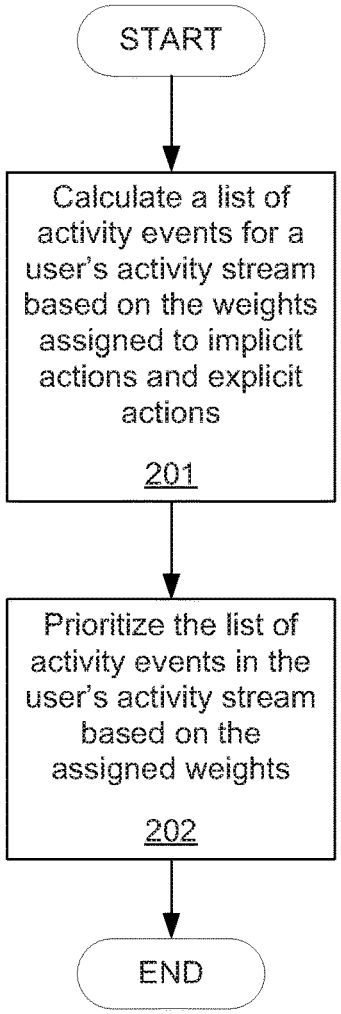
FIG. 2 is a flowchart of an example of a method for calculating lists of events in activity streams, according to one example of principles described herein.

FIG. 2 is a flowchart of an example of a method for calculating lists of events in activity streams, according to one example of principles described herein. As mentioned above, a social network service may capture multiple resources of interest to a user based on the user's implicit actions and explicit actions. As will be described below, a list of activity events for a user's activity stream is calculated based on a user's implicit actions and explicit actions and prioritized as activity events in a user's activity stream.

Turning specifically to FIG. 2, a list of activity events for a user's activity stream is calculated (201) based on weights assigned to implicit actions and explicit actions. In one example a list of activity events is determined by activity events influenced by a user's implicit actions and explicit actions. As mentioned above, implicit actions and explicit actions are created when a user interacts with resources from a social network service (FIG. 1, 142) and contents of a websites (FIG. 1, 122). Further, implicit actions with a higher weight signify the implicit actions are more relevant to the user. For example, a higher weight for an implicit action is created if a user frequently interacts with a resource from a social network service (FIG. 1, 142) or contents of a website (FIG. 1, 122). Alternatively, implicit actions with a lower weight signify the implicit actions are less relevant to the user. For example, a lower weight for an implicit action is created if a user interacts with a resource from a social network service (FIG. 1, 142) or contents of a website (FIG. 1, 122) a few times. In an extreme case where a weighed implicit action is below a certain threshold, the weighed implicit action may not influence an activity event to be used in the list of activity events. As will be described in FIG. 3, other factors and considerations are used to determine the weight of implicit actions.

As mentioned above, explicit actions are used to influence which activity events are displayed in a user's activity stream and in what order the activity events are to be displayed. Further, explicit actions with a higher weight signify the explicit actions are more relevant to the user. For example, a higher weight for an explicit action is created if a user frequently interacts explicitly with a resource from a social network service (FIG. 1, 142) or contents of a website (FIG. 1, 122). Alternatively, explicit actions with a lower weight signify the explicit actions are less relevant to the user. For example, a lower weight for an explicit action is created if a user explicitly interacts with a resource from a social network service (FIG. 1, 142) or contents of a website (FIG. 1, 122) infrequently or explicitly expressed interest in a resource a lone time ago. In a certain case where a weighed explicit action is below a certain threshold, the weighed explicit action may not influence an activity event to be used in the list of activity events. Further, it should be noted that not all explicit actions are in a user's activity stream. For example, an explicit action that is not in a user's activity stream is repeat view. However, an explicit action that is in a user's activity stream is reply to a topic. As will be described in FIG. 3, other factors and considerations are used to determine the weight of explicit actions. Thus, a list of activity events for a user's activity stream is calculated (201) based on the weights assigned to implicit actions and explicit actions.

In one example, weights for explicit actions may be determined by mentioning a user is a status update, in a comment, on a resource, or any appropriate combination thereof. Mentioning a user is created by using special characters in a status update, in a comment, on a resource, or any appropriate combination thereof. The special characters are used to allow a user to notify a user about a resource such as an object, status update, comment, blog post, forum post. As mentioned above, mentioning a user is a status update, in a comment, on a resource, or any appropriate combination thereof are displayed in a notification stream (FIG. 1, 143-2). In one example, mentioning a user is created by a user typing a status update such as "@JohnSmith look at this photograph". By typing a special character such as "@" allows a user to select a user to be notified of such an event, in this example John Smith. Further, any file, group or community referred to with the special character can also add a person using the special character "@" so that person is also notified. In keeping with the given example, the special character "@" also indicates the level of interest a user is expressing in a resource.

Additionally, using two special characters in sequential order, such as "@@", a user expresses a higher interest in a resource. As a result, using the special characters "@@" rather than the special character "@", the user is able to express a higher than average interest for a resource. Thus, a higher weight is determined for a status update, a comment, a resource, or any appropriate combination thereof using the special character "@@" than the special character "@". Next the list of activity events is prioritized (202) in the user's activity stream based on the assigned weights. Prioritizing the list of activity events in a user's activity stream is based on the weighted implicit actions and explicit actions. For example, weighted implicit actions and explicit actions having a higher weight are highly relevant to the user and are considered to be high priority. Further, implicit actions and explicit actions having a lower weight signify these actions are less relevant to the user and are considered low priority. In keeping with the given example, once the implicit actions and explicit actions are prioritized, the implicit actions and explicit actions influence which activity events are displayed in a user's activity stream and in what order the activity events are to be displayed.

Figure 3:
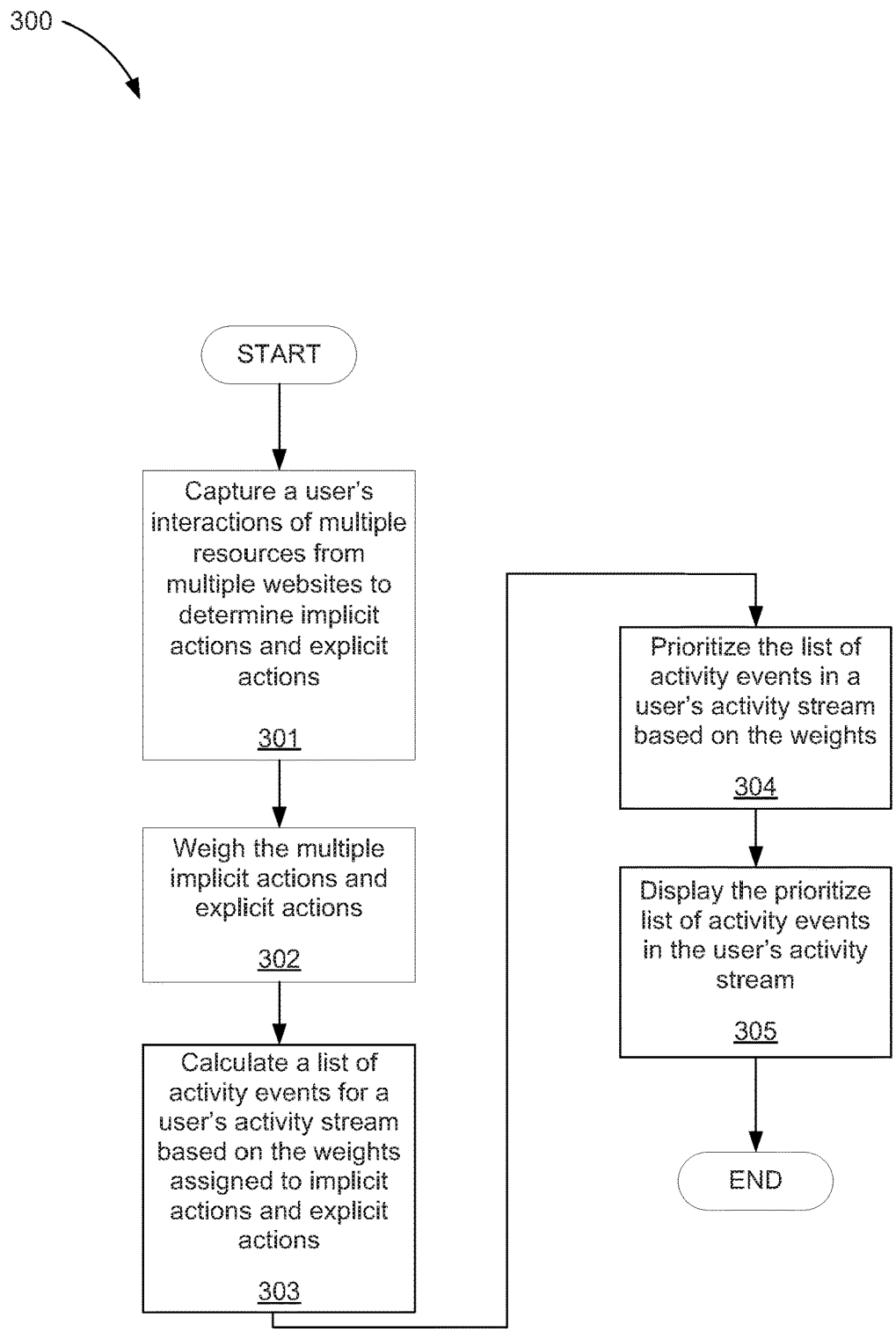
FIG. 3 is a flowchart of an example of a method for calculating lists of events in activity streams, according to one example of principles described herein.

FIG. 3 is a flowchart of an example of a method for calculating lists of events in activity streams, according to one example of principles described herein. As mentioned above, the social targeting and following routine (FIG. 1, 144) is focused on capturing resources, using implicit actions and explicit actions, that a user should follow based on a users interaction patterns with a specific resource. For example, based on a user's interaction with a resource, its age, frequency the user visits it, its use of trending terms, time spent viewing the resource, the social targeting and following routine (FIG. 1, 144) determines if a user will follow this specific resource. This will make a user aware of updates, comments, likes and other events of interest for the resource. Thus, the social targeting and following routine (FIG. 1, 144) makes a user aware of content changes and social interactions on resources they have already expressed interest in.

Turning specifically to FIG. 3, the method includes capturing (301) a user's interactions of multiple objects from multiple websites to determine implicit actions and explicit actions. As mentioned above, a user may use a user device's (FIG. 1, 130) web browser interface (FIG. 1, 131) to connect to a social network server (FIG. 1, 142) and a number of servers (FIG. 1, 120) containing websites. Using the web browser interface (FIG. 1, 131), a user may interact with content from a number of websites (FIG. 1, 120). For example, a user may access content for website 1 (FIG. 1, 122-1), website 2 (FIG. 1, 122-2), and website n (FIG. 1, 122-*n*). As mentioned above, as the user interacts with resources from each website, implicit actions are captured (301) and stored in an implicit actions repository (FIG. 1, 146). For example, when a user accesses a product website, a user will encounter resources. In one example these resources can be people, products, content, and tags among others. As a user views these resources, the user is expressing an interest in the resource. For example, as a user types in words in a search engine, the user is expressing an interest in such topics. Thus, a user's interaction with multiple resources may be captured (301) as implicit actions.

Further, as the user interacts with resources from each website, explicit actions are captured (301) and stored in an explicit actions repository (FIG. 1, 145). For example, a user can follow a resource such as an object or person, a user can want or add an item to a wish list, or a user can like a photo. Thus, a user's interaction with multiple resources may be captured (301) as explicit actions.

In one example, an explicit action is captured by an action requested event. As mentioned above, action requested events are created by using special characters to not just notify a user of an activity event, but allow the user to take an action. As mentioned above, action requested events are displayed in the action requested stream (FIG. 1, 143-3). In one example, an action requested event is created by a user typing a status update such as "!@JohnSmith please access this photograph". As mentioned above, by typing special characters such as "!@" allows a user to select a user to be notified of such an activity event and take action. In this example, John Smith is notified of this activity event and the user wants John Smith to take an action, such as to access a photograph. Further, an action requested event is displayed in a user's action requested stream (FIG. 1, 143-3).

In one example, the implicit actions and explicit actions can be captured when a user interacted with a number of resources from blogs, communities, forums, profiles, and product websites. For example, assume the system (FIG. 1, 100) captures implicit actions and explicit actions such as a user accessing blog X, reading forums by car manufacture Y, viewing a profile of a family member, wanting an item by manufacture Z, liking a photograph of a lion, searching for topics such as bonsai trees and cameras.

Next, the multiple implicit actions and explicit actions are weighed (302). As mentioned above, weighing multiple implicit actions is determined in part by a relationship of a user to a resource, time spent viewing a resource, age of last view of a resource, frequency of views of a resource, use of trending terms, and a collective graph from a user's social graph. Further, any other appropriate combination of factors may be used to weigh implicit actions. Further, implicit actions with a higher weight signify the implicit actions are more relevant to a user. Alternatively, implicit actions with a lower weight signify the implicit actions are less relevant to a user.

Additionally, weighing multiple explicit actions are determined by a user indicating interest in a resource such as reading a profile, visiting a community, replying to a topic, tagging a bookmark, repeating a view, marking a favorite, prioritizing a favorite, deprioritizing a favorite, sharing the resource, sharing the resource with an importance flag, using an action requested event, or other indicators of higher than average importance or relevance. Further, any other appropriate combination of factors may be used to weigh explicit actions. Further, explicit actions with a higher weight signify the explicit actions are more relevant to a user. Alternatively, explicit actions with a lower weight signify the explicit actions are less relevant to a user.

In one example, the weight of an implicit action or explicit action is a numerical index. The numerical index may range from 0 to 100, where 100 designates an implicit action or explicit action that is extremely relevant to a user and 0 designates an implicit action or explicit action that is entirely non-relevant.

In another example, the weight of an implicit action or explicit action is symbolic. For example, assume implicit actions and explicit actions can be rated with an extremely high weight, a high weight, an average weight, a low weight, or an extremely low weight. In keeping with the given example, assume a user accessing blog X has a high weight, reading forums by car manufacture Y has an average weight, viewing a profile of a family member has a high weight, wanting an item by manufacture Z has an average weight, liking a photograph of a lion has a low weight, searching for topics such as bonsai trees has a high weight and cameras has an extremely low weight.

Next, a list of activity events for a user's activity stream is calculated (303) based on the weights assigned to implicit actions and explicit actions. As mentioned above, the list of activity events is determined by implicit actions and explicit actions when a user interacts with a resource from the contents of websites (FIG. 1, 122). In keeping with the given example, assume the list of activity events for a user's activity stream is calculated to include any activity event influenced by an implicit action or explicit action having an average weight or higher. Thus, the list of activity events for a user's activity stream is calculated to include blog X, forums by car manufacture Y, the profile of a family member, the item by manufacture Z, and bonsai trees. Thus, the photograph of a lion and the cameras are not included in the list of activity events for a user's activity stream.

Next, the list of activity events is prioritized (304) in a user's activity stream based on the assigned weights. As mentioned above, prioritizing the list of activity events in a user's activity stream is based on the weighted implicit actions and explicit actions of the list of activity events. For example, implicit actions and explicit actions with a higher weight are prioritized before implicit actions and explicit actions with a lower weight as activity events in a user's activity stream (FIG. 1, 143-1). In one example, each weighted implicit action or weighted explicit action corresponds to an activity event. In another example, a set of weighted implicit actions or a set of weighted explicit actions corresponds to a single activity event.

In keeping with the given example, assume the list of activity events is prioritized. Assume blog X is given the highest priority. The profile of a family member is given the second highest priority. The bonsai trees are given the third highest priority. The forums by car manufacture Y is given the fourth highest priority. Finally, the item by manufacture Z is given the lowest priority.

Finally, the prioritized list of activity events is displayed (305) in the user's activity stream. In keeping with the given example, blog X is displayed first in the uses activity stream. The profile of a family member is displayed second in the user's activity stream. The bonsai trees are displayed third in the user's activity stream. The forums by car manufacture Y is displayed after the bonsai trees in a user's activity stream. Lastly, the item by manufacture Z is displayed in a user's activity stream. Thus, a user is aware of collaborative actions by other users, updates to any resources such as items or topics of interest.

Figure 4:
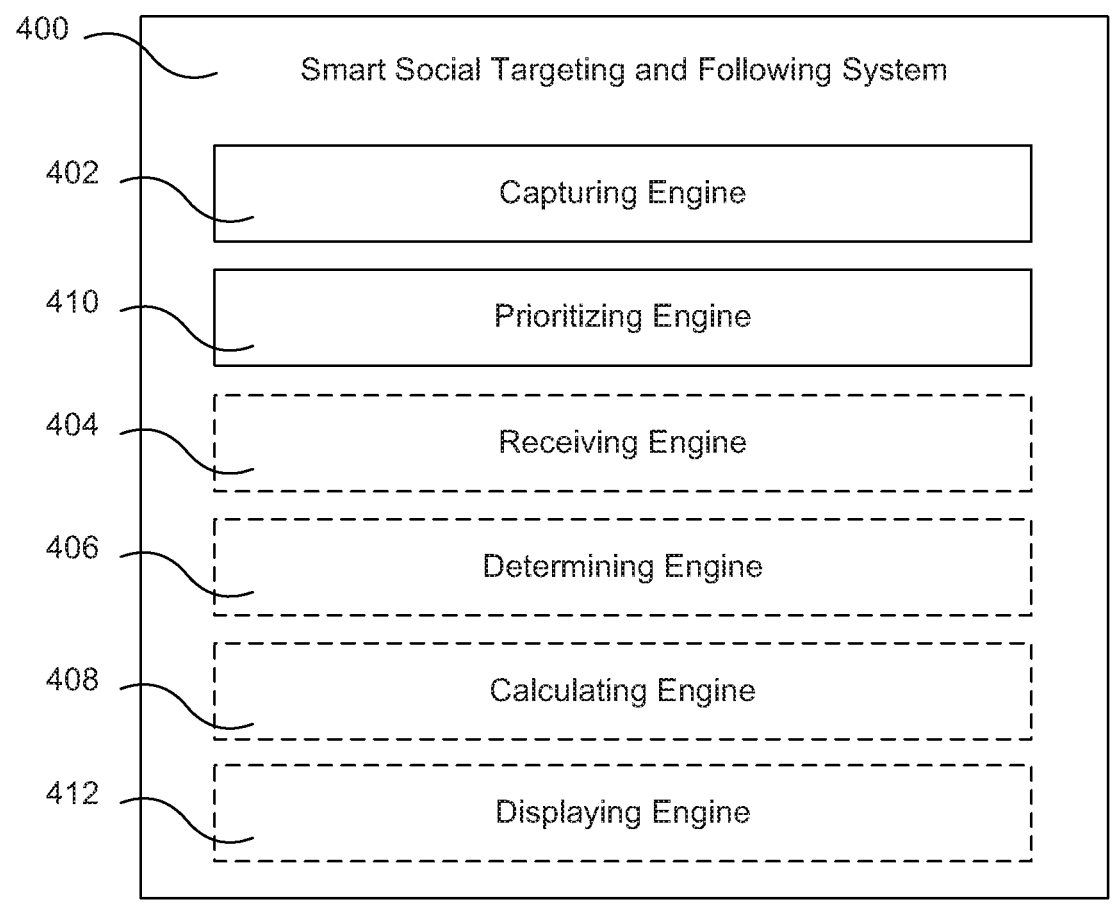
FIG. 4 is a diagram of an example of a smart social targeting and following system, according to the principles described herein.

FIG. 4 is a diagram of an example of a smart social targeting and following system (400) according to the principles described herein. The smart social targeting and following system (400) includes a capturing engine (402) and a prioritizing engine (410). In this example, the system (400) also includes a receiving engine (404), a determining engine (406), a calculating engine (408), and a displaying engine (412). The engines (402, 404, 406, 408, 410, 412) refer to a combination of hardware and program instructions to perform a designated function. Each of the engines (402, 404, 406, 408, 410, 412) may include a processor and memory. The program instructions are stored in the memory and cause the processor to execute the designated function of the engine.

The capturing engine (402) captures implicit actions and explicit actions. The implicit actions and explicit actions are captured when a user interacts with a broader social network service. In one example, capturing implicit actions and explicit actions includes monitoring a user's interaction with resources on a broader social network service such as blogs, communities, threads, forums, or even product websites.

The receiving engine (404) receives captured implicit actions and explicit actions. In one example, the information from the captured implicit actions and explicit actions is received by a social network service. Further, the received information from the captured implicit actions and explicit actions is stored in memory. In one example, the information from the captured implicit actions and explicit actions is stored in a repository on the social network's server. In another example, the information from the captured implicit actions and explicit actions is stored in memory on a user's device. Further, any appropriate combination may be used to store captured implicit actions and explicit actions.

The determining engine (406) determines the weight of each received implicit action and explicit action. In one example, an implicit action's weight is determined by a relationship of a user to a resource, time spent viewing a resource, age of last view of a resource, frequency of views of a resource, use of trending terms, a collective graph form a user's social graph, or any combinations thereof. In another example, an explicit action's weight is determined by a user indicating interest in a resource such as reading a profile, visiting a community, replying to a topic, tagging a bookmark, repeating a view, marking a favorite, prioritizing a favorite, deprioritizing a favorite, sharing the resource, sharing the resource with an importance flag, using an action requested event, other indicators of higher than average importance, or any combinations thereof.

The calculating engine (408) calculates a list of activity events for a user's activity stream based on weighted implicit actions and explicit actions. In one example, calculating a list of activity events for a user's activity stream includes using activity events influenced by all captured implicit actions and explicit actions. In another example, calculating a list of activity events for a user's activity stream includes using activity events influenced by implicit actions and explicit actions having a weight higher than a designated threshold.

The prioritizing engine (410) prioritizes the calculated list of activity events. In one example, prioritizing a list of activity events in a user's activity stream based on the weighted implicit actions and explicit actions of the list of activity events includes prioritizing higher weighed implicit actions and explicit actions before lower weighted implicit actions and explicit actions.

The displaying engine (412) displays the prioritized list of activity events in a user's activity stream. In one example, displaying the prioritized list of activity events in a user's activity stream includes displaying activity events influenced by higher weighed implicit actions and explicit actions before activity events influenced by lower weighted implicit actions and explicit actions in a user's activity stream (FIG. 1, 143-1).

Figure 5:
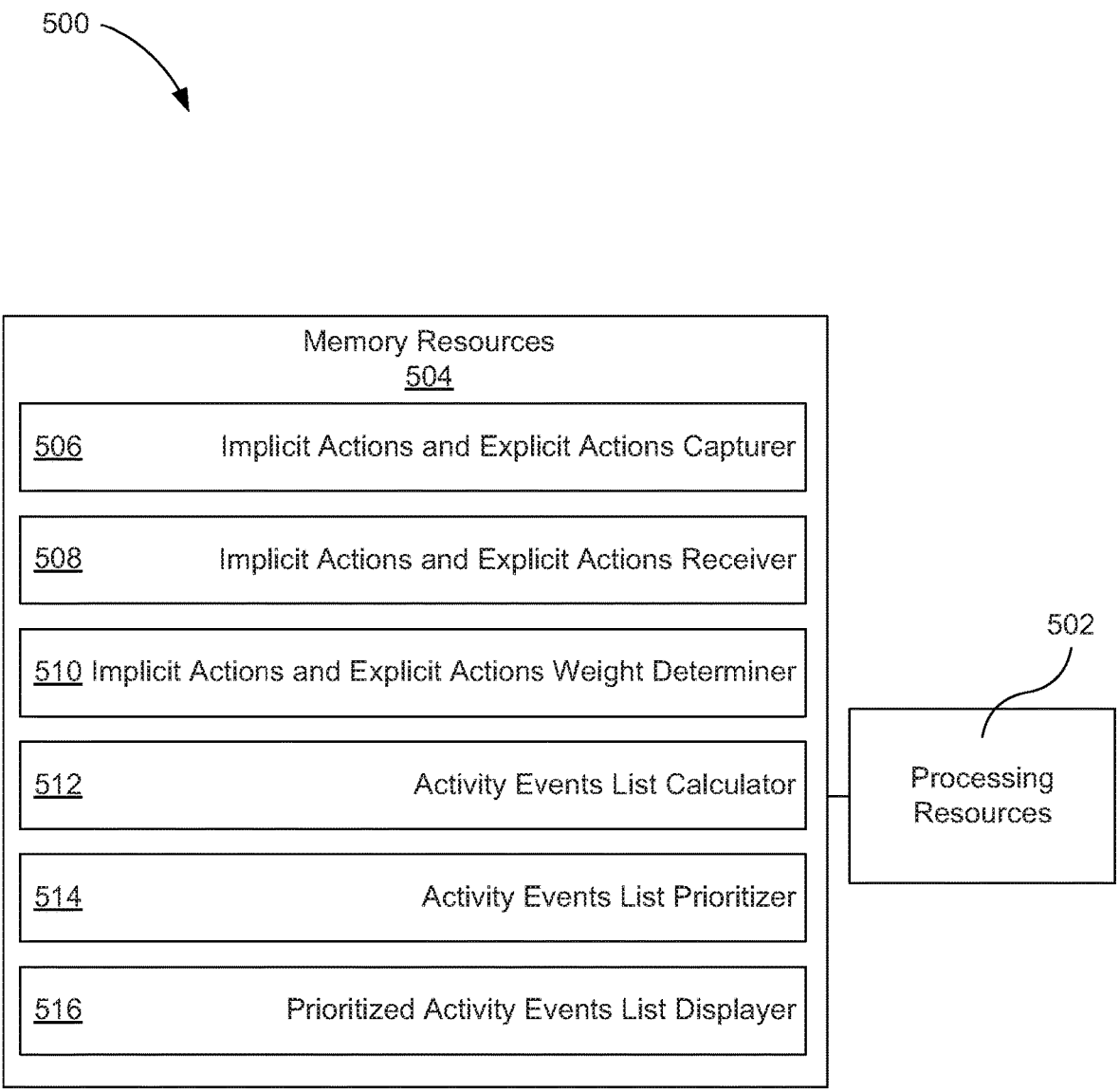
FIG. 5 is a diagram of an example of a smart social targeting and following system, according to principles described herein.

FIG. 5 is a diagram of an example of a smart social targeting and following system (500), according to principles described herein. In this example, the calculating lists of events in activity streams system (500) includes processing resources (502) that are in communication with memory resources (504). Processing resources (502) include at least one processor and other resources used to process programmed instructions. The memory resources (504) represent generally any memory capable of storing data such as programmed instructions or data structures used by the smart social targeting and following system (500). The programmed instructions shown stored in the memory resources (504) include an implicit actions and explicit actions capturer (506), a implicit actions and explicit actions receiver (508), an implicit actions and explicit actions weight determiner (510), an activity events list calculator (512), an activity events list prioritizer (514), and a prioritized activity events list displayer (516).

The memory resources (504) include a computer readable storage medium that contains computer readable program code to cause tasks to be executed by the processing resources (502). The computer readable storage medium is a tangible storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, other types of memory, or combinations thereof.

The implicit actions and explicit actions capturer (506) represents programmed instructions that, when executed, cause the processing resources (502) to capture implicit actions and explicit actions. The implicit actions and explicit actions receiver (508) represents programmed instructions that, when executed, cause the processing resources (502) to receive implicit actions and explicit actions. The implicit actions and explicit actions weight determiner (510) represents programmed instructions that, when executed, cause the processing resources (502) to determine the weight of implicit actions and explicit actions. The activity events list calculator (512) represents programmed instructions that, when executed, cause the processing resources (502) to calculates an activity events list. The activity events list prioritizer (514) represents programmed instructions that, when executed, cause the processing resources (502) to prioritize the list of activity events. The prioritized activity events list displayer (516) represents programmed instructions that, when executed, cause the processing resources (502) to display the prioritized activity events list in a user's activity stream.

Further, the memory resources (504) may be part of an installation package. In response to installing the installation package, the programmed instructions of the memory resources (504) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (502) and the memory resources (504) are located within the same physical component, such as a server, or a network component. The memory resources (504) may be part of the physical component's main memory, caches, registers, non-volatile memory, or elsewhere in the physical component's memory hierarchy. Alternatively, the memory resources (504) may be in communication with the processing resources (502) over a network. Further, the data structures, such as the libraries, may be accessed from a remote location over a network connection while the programmed instructions are located locally. Thus, the recommendation system (500) may be implemented on a user device, on a server, on a collection of servers, or combinations thereof.

The smart social targeting and following system (500) of FIG. 5 may be part of a general purpose computer. However, in alternative examples, the smart social targeting and following system (500) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A method of identifying and applying author provided weights for items in an activity stream of a first user, the method comprising, with a processor having an associated memory:
   receiving a first item containing an identifier for the first user, the first item not including an associated special character string to notify the first user;
   receiving a second item, the second item containing the identifier for the first user and a first special character string to notify the first user;
   receiving a third item, the third item containing the identifier for the first user and a second special character string to notify the user;
   weighting the first, second, and third items based on the special character strings, wherein the second item has a greater weighting than the first item due to the first special character string and the third item has a greater weighting than the second item due to the second special character string;
   and
   displaying the first, second, and third items in the activity stream of the first user ordered by the weightings.

2. The method of claim 1, wherein a special character string is appended to a username for the first user.

3. The method of claim 1, wherein the first special character string and the second special character string begin with a same character.

4. The method of claim 1, wherein the first special character string and the second special character string have a different length.

5. The method of claim 1, wherein the first special character string is the character @ and the second special character string is the two characters @!.

6. The method of claim 1, wherein the second special character string signals a request for an action to be performed by the first user.

7. The method of claim 6, wherein the action is viewing a posted media.

8. A computer program product includes a computer readable storage medium, wherein the computer readable storage medium is not a signal per se, the computer readable storage medium having computer readable program code which when executed by a processor, causes the processor to perform the following actions:
   identify instances of an identifier of the first user in an activity stream, wherein the instances of the identifier of the first user in the activity stream have 1) a first special character string associated with the identifier of the first user, 2) a second special character string associated with the identifier of the first user, and 3) no special character string associated with the identifier of the first user, wherein;
   the second special character string is an action request,
   the second special character string produces a higher weighting for an associated item than the first special character string,
   the first special character string produces a higher weighting for an associated item than use of the identifier of the first user with no special character string,
   the first special character string is not an action request; and
   sorting items in the activity stream based on the weightings.

9. The computer program product of claim 8, wherein the action request is to view a posted image.

10. The computer program product of claim 8, wherein weightings of items in the activity stream further depend on implicit and explicit actions by the first user.

11. The computer program produce product of claim 10, wherein weighting of items in the activity stream further depend on an implicit action selected from a group consisting of: relationship of a user to a resource, time spent viewing a resource, age of last view of a resource, frequency of views of a resource, use of trending terms, and a collective social graph of the first user.

12. The computer program product of claim 10, wherein weighting of items in the activity stream further depend on an explicit action selected from a group consisting of: indicating interest in a resource such as reading a profile, visiting a community, replying to a topic, tagging a bookmark, repeating a view, marking a favorite, prioritizing a favorite, deprioritizing a favorite, sharing the resource, sharing the resource with an importance flag, and using an action requested event.

13. The computer program product of claim 8, wherein the instructions further cause the processor to: capture implicit and explicit actions by the first user as the first user interacts with multiple websites.

14. The computer program product of claim 8, wherein weighting is determined by collective viewing pattern of a social graph of the first user where the weightings are based on contributions of the social graph depend on a degree of relationship between member of the social graph and the first user.

15. A system for providing requests between members of a social network, the system comprising a processor having an associated memory, wherein the memory contains instructions, which when executed, cause the processor to:
prioritize presentation of a first item with an instance of an identifier for a first user including a second special character string over a second item with an instance of the identifier for the first user including a first special character string;
prioritize presentation of the first item with the instance of the identifier for the first user including the first special character string over a third item with an instance of the identifier for the first user without a priority mark;
present the first, second, and third items in a display ordered based on the prioritization;
wherein the second special character string indicates a request made of the first user.

16. The system of claim 15, wherein the second special character string begins with the symbol !.

17. The system of claim 15, wherein the second special character string consists of the symbols !@.

18. The system of claim 17, wherein the first special character string consists of the symbol @.

19. The system of claim 15, wherein the request made of the first user comprises viewing an image.

20. The system of claim 15, wherein the instructions further cause the processor to: prioritize items with groups having a common special character string by a degree of relationship on a social graph of the first user between an author of an item and the first user.

* * * * *